(12) United States Patent
Miller

(10) Patent No.: US 11,304,423 B2
(45) Date of Patent: Apr. 19, 2022

(54) APPARATUS, SYSTEM, AND METHOD FOR HIGH SPEED PRODUCTION OF FOOD PRODUCT

(71) Applicant: Risco USA Corporation, South Easton, MA (US)

(72) Inventor: Alan G. Miller, South Easton, MA (US)

(73) Assignee: RISCO USA CORPORATION, South Easton, MA (US)

( * ) Notice: Subject to any disclaimer, the term of this patent is extended or adjusted under 35 U.S.C. 154(b) by 504 days.

(21) Appl. No.: 15/968,549

(22) Filed: May 1, 2018

(65) Prior Publication Data
US 2019/0335769 A1 Nov. 7, 2019

(51) Int. Cl.
*A22C 17/00* (2006.01)
*A23P 30/00* (2016.01)

(52) U.S. Cl.
CPC .......... *A22C 17/0006* (2013.01); *A23P 30/00* (2016.08)

(58) Field of Classification Search
CPC .... A22C 17/006; A22C 17/0093; B26D 1/08; B26D 1/60; B26D 5/16; B65G 21/14; A23P 30/00; B65B 25/08
USPC ..... 83/37, 155, 13, 734, 651, 385, 298, 312, 83/313, 260, 112, 109, 110, 318–320, 73, 83/311, 403.1, 801, 589, 649, 369, 370
See application file for complete search history.

(56) References Cited

U.S. PATENT DOCUMENTS

| | | |
|---|---|---|
| 1,924,162 A | 8/1933 | Mason |
| 2,112,443 A | 3/1938 | Martoccio |
| 3,072,004 A | 1/1963 | Jenkins |
| 3,128,660 A | 4/1964 | Gaubert |
| 3,354,765 A | 11/1967 | Frey |
| 3,448,696 A * | 6/1969 | Verhoeven .............. B65B 23/14 426/503 |
| 3,572,695 A | 3/1971 | Janirek et al. |
| 3,659,519 A | 5/1972 | MacManus |
| 3,668,821 A | 6/1972 | Benson et al. |
| 3,767,320 A | 10/1973 | Theis et al. |

(Continued)

FOREIGN PATENT DOCUMENTS

| | | |
|---|---|---|
| EP | 3081090 A1 | 10/2016 |
| GB | 2027383 A | 2/1980 |

(Continued)

OTHER PUBLICATIONS

International Search Report and Written Opinion issued by the European Patent Office in PCT/US2019/027641, dated Jul. 2, 2019 (14 pages).

(Continued)

*Primary Examiner* — Ghassem Alie

(74) *Attorney, Agent, or Firm* — Wilmer Cutler Pickering Hale and Dorr LLP

(57) ABSTRACT

The present disclosure provides a mechanical system for providing a food product on a sheet of paper. The disclosed mechanical system includes an adjustable conveyor belt system that is configured to enable a puck of food product to land up-right. The angle (e.g., slope) of the adjustable conveyor belt system can be adjusted to account for variations in the size and shape of the puck. The disclosed mechanical system also includes a flattener that is configured to provide memory to the pressed pucks.

13 Claims, 15 Drawing Sheets

(56) References Cited

U.S. PATENT DOCUMENTS

| | | |
|---|---|---|
| 3,837,246 A | 9/1974 | Juditzki |
| 3,842,536 A | 10/1974 | Schick |
| 3,869,757 A | 3/1975 | Holly |
| 3,870,013 A | 3/1975 | Wagner |
| 3,898,863 A | 8/1975 | Wagner |
| 3,926,146 A | 12/1975 | Breyer et al. |
| 3,939,530 A | 2/1976 | Holly |
| 3,942,411 A | 3/1976 | Gerber |
| 3,952,478 A | 4/1976 | Richards et al. |
| 3,953,613 A * | 4/1976 | Morgenthaler ........ A21C 9/088 426/502 |
| 3,964,127 A | 6/1976 | Holly |
| 3,966,970 A | 6/1976 | Williams |
| 3,975,976 A | 8/1976 | Prentice |
| 3,976,389 A | 8/1976 | Theis, Jr. |
| 4,030,393 A | 6/1977 | Steiner |
| 4,054,967 A | 10/1977 | Sandberg et al. |
| 4,097,961 A | 7/1978 | Richards |
| 4,113,415 A | 9/1978 | Holly |
| 4,128,164 A | 12/1978 | Sandberg |
| 4,153,974 A | 5/1979 | Holly et al. |
| 4,161,855 A | 7/1979 | Mulvey et al. |
| 4,173,127 A | 11/1979 | Sandberg |
| 4,182,003 A | 1/1980 | Lamartino et al. |
| 4,187,581 A | 2/1980 | Wagner |
| 4,196,645 A | 4/1980 | Shimizu et al. |
| 4,203,335 A | 5/1980 | Coffey |
| 4,233,710 A | 11/1980 | Wagner |
| 4,276,753 A | 7/1981 | Sandberg et al. |
| 4,317,259 A | 3/1982 | Wagner |
| 4,334,339 A | 6/1982 | Holly |
| 4,343,603 A | 8/1982 | Pavlow et al. |
| 4,343,755 A | 8/1982 | Miller et al. |
| 4,356,595 A | 11/1982 | Sandberg et al. |
| 4,372,008 A | 2/1983 | Sandberg |
| 4,395,427 A | 7/1983 | Fischer et al. |
| 4,417,434 A | 11/1983 | Piereder |
| 4,418,446 A | 12/1983 | Sandberg et al. |
| 4,428,263 A | 1/1984 | Lindee et al. |
| 4,498,784 A | 2/1985 | Bernhardsson et al. |
| 4,549,458 A | 10/1985 | Townsend |
| 4,565,054 A | 1/1986 | Piereder |
| 4,642,849 A | 2/1987 | Piereder |
| 4,651,498 A | 3/1987 | Piereder |
| 4,736,896 A | 4/1988 | Wagner |
| 4,768,260 A | 9/1988 | Sandberg |
| 4,768,325 A | 9/1988 | Lindee et al. |
| 4,830,230 A | 5/1989 | Powers |
| 4,871,410 A | 10/1989 | Bonnebat et al. |
| 4,928,591 A | 5/1990 | Lindee |
| 4,962,568 A | 10/1990 | Rudy et al. |
| D312,193 S | 11/1990 | Cooper |
| 5,029,735 A | 7/1991 | Dennis et al. |
| 5,034,801 A | 7/1991 | Fischer |
| 5,035,671 A | 7/1991 | Anderson et al. |
| 5,060,562 A | 10/1991 | Florindez |
| 5,071,326 A | 12/1991 | Wright et al. |
| 5,073,391 A | 12/1991 | DeMars et al. |
| 5,135,763 A | 8/1992 | Gillam et al. |
| 5,241,898 A | 9/1993 | Newnan |
| 5,405,663 A | 4/1995 | Archibald et al. |
| D361,480 S | 8/1995 | Cooper |
| 5,476,035 A | 12/1995 | Florindez |
| 5,517,904 A | 5/1996 | Vargas et al. |
| RE35,297 E | 7/1996 | Anderson et al. |
| D371,283 S | 7/1996 | Cooper |
| 5,542,342 A | 8/1996 | McNeill et al. |
| 5,544,572 A | 8/1996 | Garmendia |
| 5,620,728 A | 4/1997 | Langley et al. |
| 5,691,399 A | 11/1997 | Koblitz et al. |
| 5,732,447 A | 3/1998 | Nolen et al. |
| 5,759,602 A | 6/1998 | Kobussen et al. |
| 6,001,402 A | 12/1999 | Dupont |
| 6,032,561 A | 3/2000 | Lonn et al. |
| 6,056,634 A | 5/2000 | Schwarz et al. |
| 6,065,392 A | 5/2000 | Florindez |
| 6,152,194 A | 11/2000 | Tenkanen et al. |
| 6,170,369 B1 | 1/2001 | Weinstein et al. |
| 6,269,850 B1 | 8/2001 | Price et al. |
| 6,331,104 B1 | 12/2001 | Kobussen et al. |
| 6,374,873 B1 | 4/2002 | Price et al. |
| 6,413,073 B2 | 7/2002 | McFarland |
| 6,416,314 B1 | 7/2002 | LaBruno |
| 6,428,303 B2 | 8/2002 | Lindee et al. |
| 6,454,622 B2 | 9/2002 | Mashiko et al. |
| 6,479,087 B1 | 11/2002 | Cole et al. |
| 7,681,630 B2 | 3/2010 | Klassen et al. |
| 7,861,630 B2 | 1/2011 | Sorensen et al. |
| 8,833,222 B2 | 9/2014 | Oki et al. |
| 8,848,390 B2 | 9/2014 | Jin et al. |
| 8,997,614 B2 | 4/2015 | Baechtle et al. |
| 9,107,424 B2 | 8/2015 | Miller |
| 2005/0230875 A1 | 10/2005 | Miller et al. |
| 2006/0017189 A1 | 1/2006 | Miller |
| 2008/0028904 A1 | 2/2008 | Arikita |
| 2009/0238662 A1 | 9/2009 | Duquette |
| 2013/0000454 A1 * | 1/2013 | Miller ...................... B26D 5/16 83/37 |
| 2013/0205961 A1 | 8/2013 | Baechtle et al. |
| 2014/0352505 A1 * | 12/2014 | Grasselli ............. B26D 7/0625 83/13 |
| 2015/0033921 A1 * | 2/2015 | Finnsson .................. B26D 1/04 83/73 |

FOREIGN PATENT DOCUMENTS

| | | |
|---|---|---|
| GB | 2239787 A | 7/1991 |
| WO | WO-9914021 A1 | 3/1999 |
| WO | WO-200013864 A1 | 3/2000 |
| WO | WO-2012069185 A1 | 5/2012 |

OTHER PUBLICATIONS

International Search Report and Written Opinion issued by the European Patent Office as the International Searching Authority for International Application No. PCT/US2012/041282 dated Nov. 21, 2012 (16 pgs.).

* cited by examiner

APPARATUS, SYSTEM, AND METHOD FOR HIGH SPEED PRODUCTION OF FOOD PRODUCT

CROSS-REFERENCE TO RELATED APPLICATION

This application is related to U.S. Pat. No. 9,107,424, titled "MACHINE AND METHOD FOR HIGH SPEED CUTTING AND PORTIONING OF EXTRUDED PRODUCTS," by Alan Miller, issued on Aug. 18, 2015; and U.S. Pat. No. 8,840,390, titled "MACHINE FOR THE PRODUCTION OF FORMED PATTIES WITH A HAND MADE APPEARANCE, AND METHOD FOR INTERLEAVING PAPER AND STACKING," by Alan Miller, issued on Sep. 23, 2014, each of which is incorporated herein by reference in its entirety.

FIELD OF THE INVENTION

This disclosure relates to apparatuses, systems, and methods for high-speed cutting and portioning of food product, including, for example, meat patties.

BACKGROUND

Existing mechanical systems can mold and cut ground meat or a similar paste to manufacture food products, such as meat patties. In one example, the mechanical system can include (1) a die with a desired cross-sectional shape (e.g., a round shape) that receives ground meat and shapes the ground meat into the die's cross-sectional shape, (2) a portioner that cuts shaped ground meat into a small portion (also referred to as a puck), (3) a conveyor belt that receives the puck from the portioner and carries the puck from one location to another location, and (4) a flattener that presses the puck into a desired thickness as the puck is carried on the conveyor belt. When the pressed puck arrives at the end of the conveyor belt, the pressed puck has the appearance of a meat patty that is ready for cooking.

SUMMARY

The systems disclosed herein provide an apparatus comprising an adjustable conveyor system configured to carry a paper backing and receive, on the paper backing, a puck of product from a portioner. The apparatus further comprises a first conveyor belt, a second conveyor belt, and a knife assembly. The first conveyor belt can be configured to receive the paper backing and the puck of product from the adjustable conveyor system. The second conveyor belt can be substantially co-planar with the first conveyor belt in a first plane. In some embodiments, a distal end of the first conveyor belt is near a proximal end of the second conveyor belt. The knife assembly can be mounted at least in part between the first and second conveyor belts and can comprise a die slot between the first and second conveyor belts. The knife assembly can further comprise a blade that is movable in a first direction perpendicular to the first plane from an upper position spaced in the first direction from the first and second conveyor belts to a lower position. In some embodiments, the knife assembly is configured to cut only the paper backing into a sheet of paper while the paper backing is transferred from the first conveyor belt to the second conveyor belt, thereby providing the puck of product on a sheet of paper.

In some embodiments, the first conveyor belt comprises a first part that is co-planar with the second conveyor belt, and a second part configured to accommodate an adjustment to a slope relative to the first part. The slope can vary in a range and can be adjusted based on a number of factors including the shape of a puck of product and the speed of the conveyor belts.

In some embodiments, the portioner comprises a knife system configured to drop the puck into the paper backing carried by the adjustable conveyor system. The knife system can comprise a rotary knife. In some embodiments the rotary knife comprises a wall defining a slot, a rotary plate, and a knife. The knife can include a first end, an intermediate portion, and a second end, the second end including a cutting blade, and the intermediate portion disposed between the first end and the second end. In some embodiments, the first end cooperates with the slot, and the intermediate portion is coupled to the rotary plate. The rotary plate can be configured to move the intermediate portion along a circular pathway and reciprocatingly move the first end along the slot when the rotary plate is rotated.

In some embodiments, the apparatus further comprises a flattener including a powered press belt, wherein the powered press belt comprises a first roller, a second roller, and a third roller. The three rollers can be placed at different vertical heights and displaced horizontally from one another. In some embodiments, the first and second rollers can be placed at the same vertical height.

In some embodiments, the knife assembly is triggered to cut in-between a first puck and a second puck to provide the first puck and the second puck on a first sheet of paper and a second sheet of paper, respectively. In some embodiments, the knife assembly is triggered not to cut in-between the second puck and a third puck to provide the second puck and the third puck on the second sheet of paper. In some embodiments, the apparatus comprises a paper roller that is configured to provide the paper backing to the adjustable conveyor system. The adjustable conveyor system can be configured to pull the paper backing from the paper roller.

DETAILED DESCRIPTION

Existing mechanical systems for making pressed food products, such as meat patties, can be speed-limited. When a mechanical system is designed to operate at a high speed, a portioner in the mechanical system tends to make pucks with a small diameter and a large height so that (1) the portioner can easily cut molded food product to create pucks and (2) the pucks have enough food product for serving. Because pucks tend to have a small diameter and a large height, with an appearance similar to a cork, placing the pucks up-right on a conveyor belt can be difficult. Unfortunately, placing the pucks up-right on the conveyor belt is important for making pressed food products with a consistent shape. For instance, if some pucks are up-right on a conveyor belt and if other pucks are lying down on the conveyor belt, the pressed pucks will have different shapes depending on whether the pucks were up-right or lying down. Therefore, existing mechanical systems are often configured to operate at a lower speed and with pucks that are less elongated.

Existing mechanical systems also use a flattener that tends to release the pressed food product as soon as pressed food product has a desired thickness. Such an immediate release can be problematic because such pressed food product may lose its shape when cooked.

The present disclosure provides an improved mechanical system that addresses the above-identified deficiencies of existing mechanical systems. The disclosed mechanical system includes an angled conveyor belt system that is configured to enable the pucks to land up-right regardless of the size and shape of the pucks. The angle (e.g., slope) of the angled conveyor belt system can be adjusted to account for variations in the size and shape of the pucks as well as the speed of the conveyor belt. The disclosed mechanical system also includes a flattener that is configured to provide "memory" to the pressed pucks. For example, the flattener can be configured to maintain the pressed pucks at their thickness for a period of time so that the thickness of the pressed pucks (e.g., the meat patties) is maintained.

Figure 1:
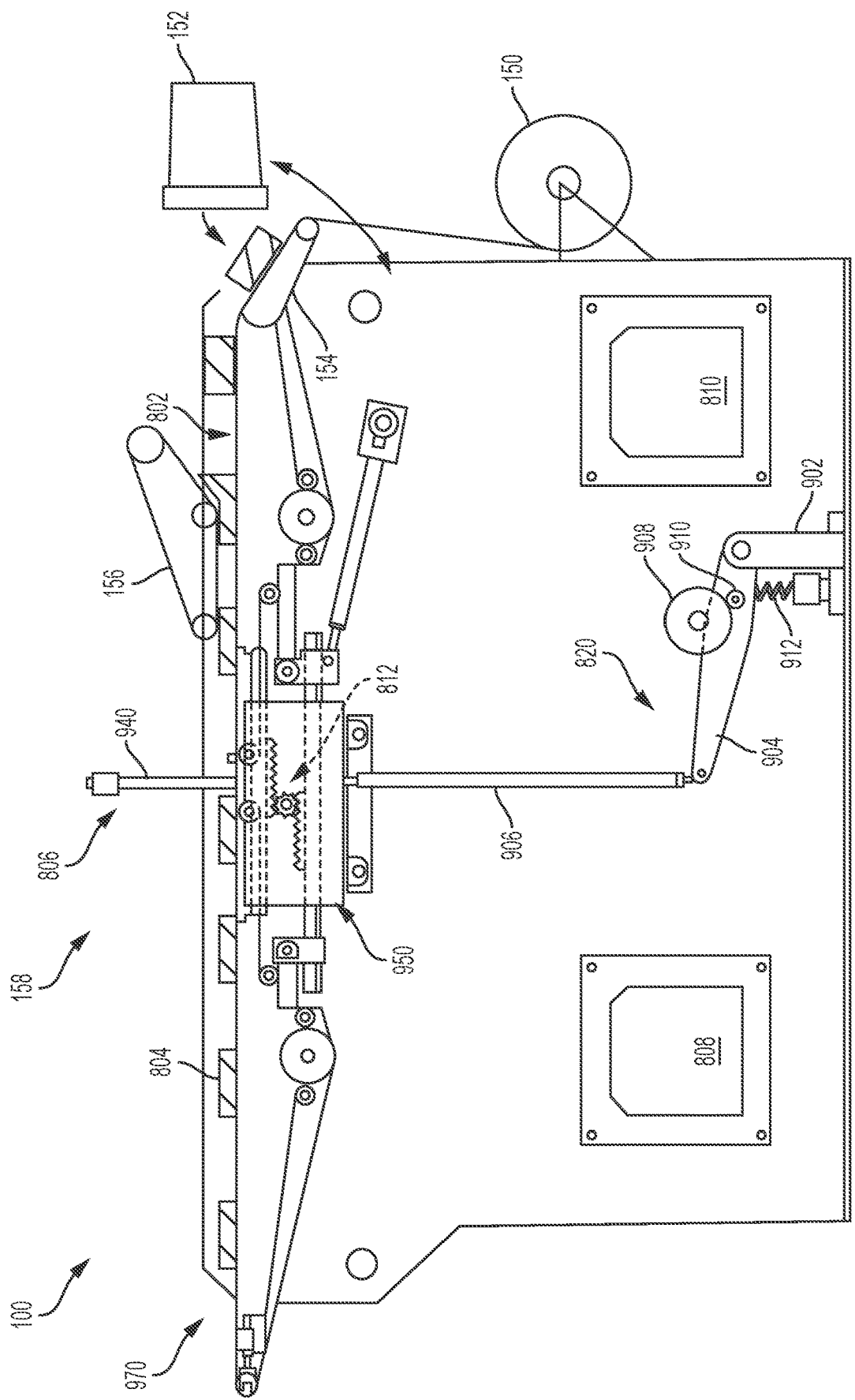
FIG. 1 is a side view of an embodiment of the systems disclosed herein.
Figure 2:
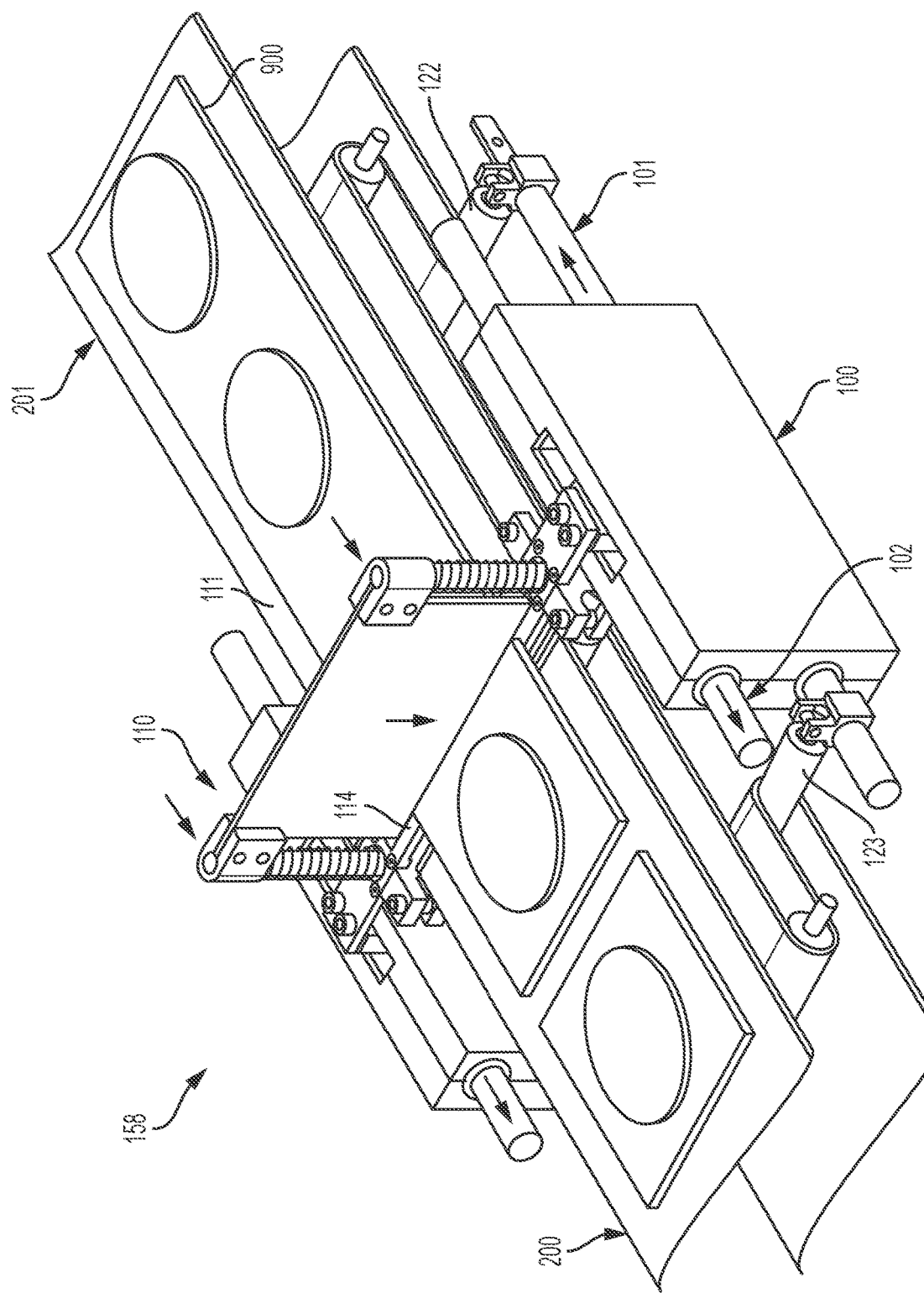
FIG. 2 is a perspective view of an embodiment of the systems disclosed herein showing a blade in its fully cut position.
Figure 3:
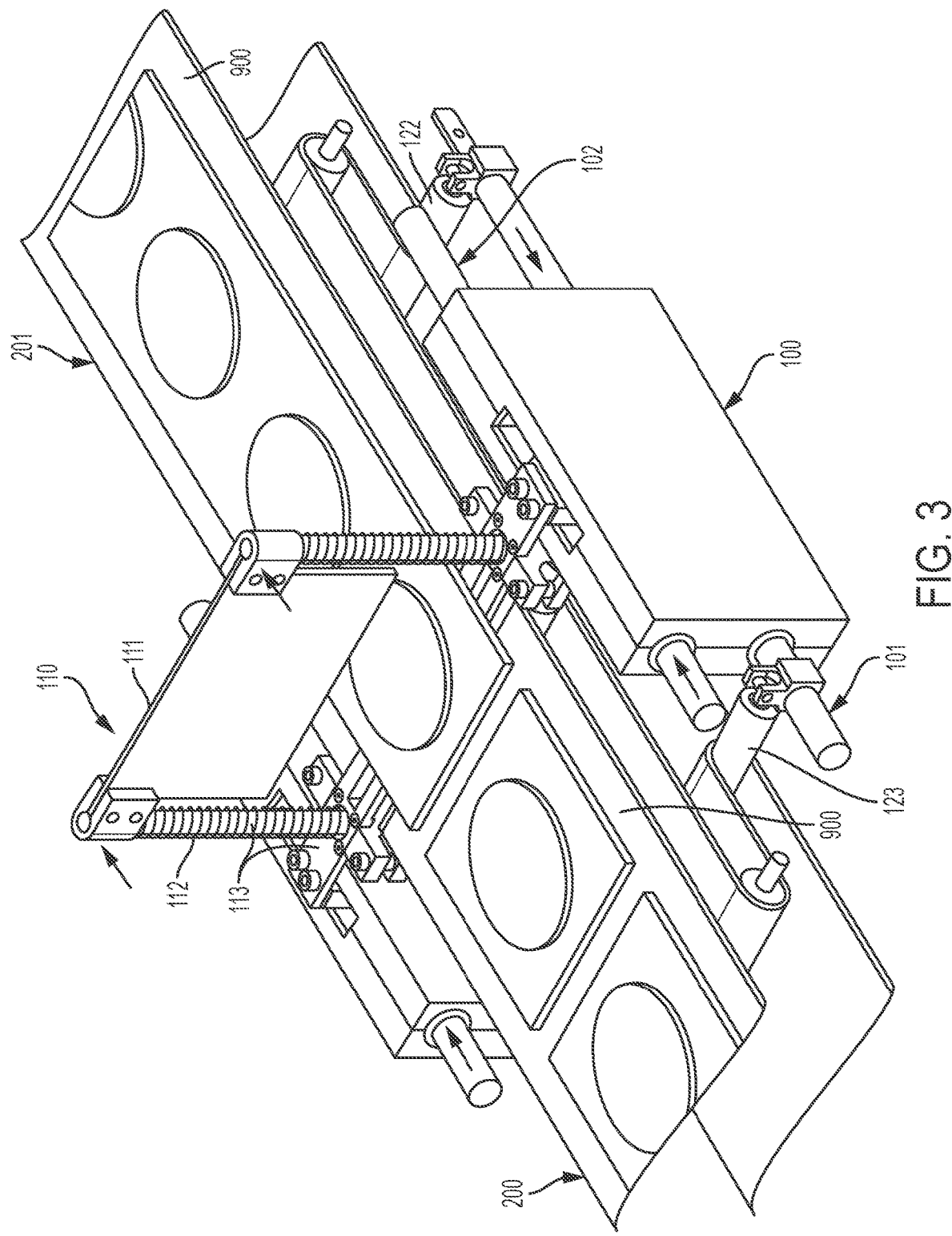
FIG. 3 is a perspective view of an embodiment of the systems disclosed herein showing a knife assembly in its uppermost position.

Overview (FIGS. 1-3)

FIG. 1 illustrates a mechanical system for providing a pressed food product on a sheet of paper in accordance with some embodiments. The mechanical system 100 includes a paper roll 150, a portioner 152, an angled conveyor belt 154, an extended flattener 156, and a paper cutting system 158.

The mechanical system 100 is configured to provide a pressed food product on a sheet of paper. The pressed food product can include meat products, such as ground meat, having a desired shape. The pressed food product can be transported from one location to another location by a conveyor belt on the paper cutting system 158, and potentially at high speed and in a continuous manner. For example, while conventional techniques may be capable of processing 60-80 or even 120 pieces per minute ("PPM"), the system disclosed herein is capable of processing 150-200 PPM. Additionally, a continuous paper roll is used during the portioning and flattening phases. In some embodiments, the paper is only cut after a puck has been properly deposited on the paper. Hereinafter, the food product can be referred to as meat or ground meat, but other product could be used, such as dough.

The mechanical system 100 is configured to cut the food product into pucks using the portioner 152, and place the pucks onto a long paper backing provided by the paper roll 150. When the portioner 152 provides the pucks onto the long paper backing, the mechanical system 100 catches the pucks using the angled conveyor belt 154. Subsequently, the mechanical system 100 is configured to press the pucks using the flattener 156, and to cut the paper backing into separate sheets of paper to provide pressed pucks on separate sheets of paper.

In some embodiments, the paper roll 150 is configured to provide a long paper backing onto which a puck can be placed. For example, the paper roll 150 is configured to provide a paper backing to the angled conveyor belt 154, which is configured to receive the pucks. The paper roll 150 can be configured to provide the paper backing at a speed that substantially matches the rotation speed of the angled conveyor belt 154 and conveyor belts in the paper cutting system 158. For example, the paper roll 150 can be placed on a paper roll holder that dispenses a paper backing when the paper backing is pulled. In this configuration, the paper backing can be pulled by the angled conveyor belt 154 so that the paper roll 150 dispenses the paper backing at a speed that matches the speed of the angled conveyor belt 154. In some embodiments, a roller can be used to align the paper to the center of the belt. In some embodiments, the weight of the product on the paper presses the paper against the angled conveyor belt 154 and conveyor 802 (described below), thereby introducing sufficient friction to pull the paper from paper roll 150 along with the belts.

Figure 15:
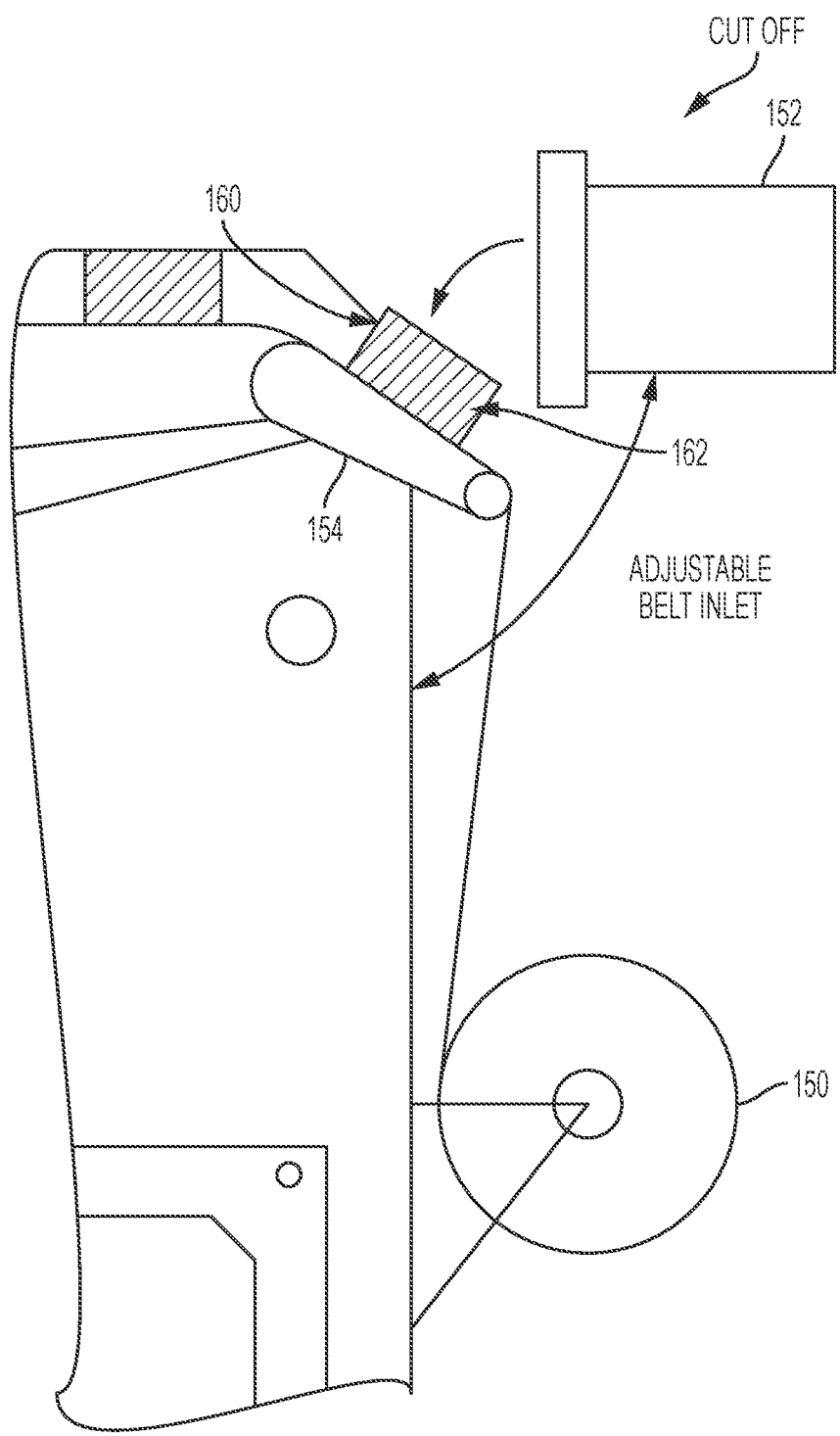
FIG. 15 is an expanded view of the side view shown in FIG. 1.

In some embodiments, the portioner 152 can be configured to cut food product (e.g., ground meat) into a puck. For example, the portioner 152 can include a knife system. The knife system can include, for example, a knife, a simple guillotine, and/or a rotary knife. The knife system in the portioner 152 can be configured to receive molded food product having a desired cross-section and cut the food product into one or more pucks. The knife system is configured to provide the pucks onto a paper backing carried by the angled conveyor belt 154. For example, the knife system can be configured to drop a puck onto a paper backing carried by the angled conveyor system 154, and the angled conveyor belt 154 can be configured to catch the puck on the paper backing. For example, as illustrated in FIG. 15, the angled conveyor belt 154 can be adjusted to an angle such that the top edge of the puck 160 makes contact with the paper roll 150 before the bottom edge of the puck makes contact with the paper roll 150. This can help to ensure that the puck maintains the proper shape and orientation as it lands on the paper roll 150.

Figure 12:
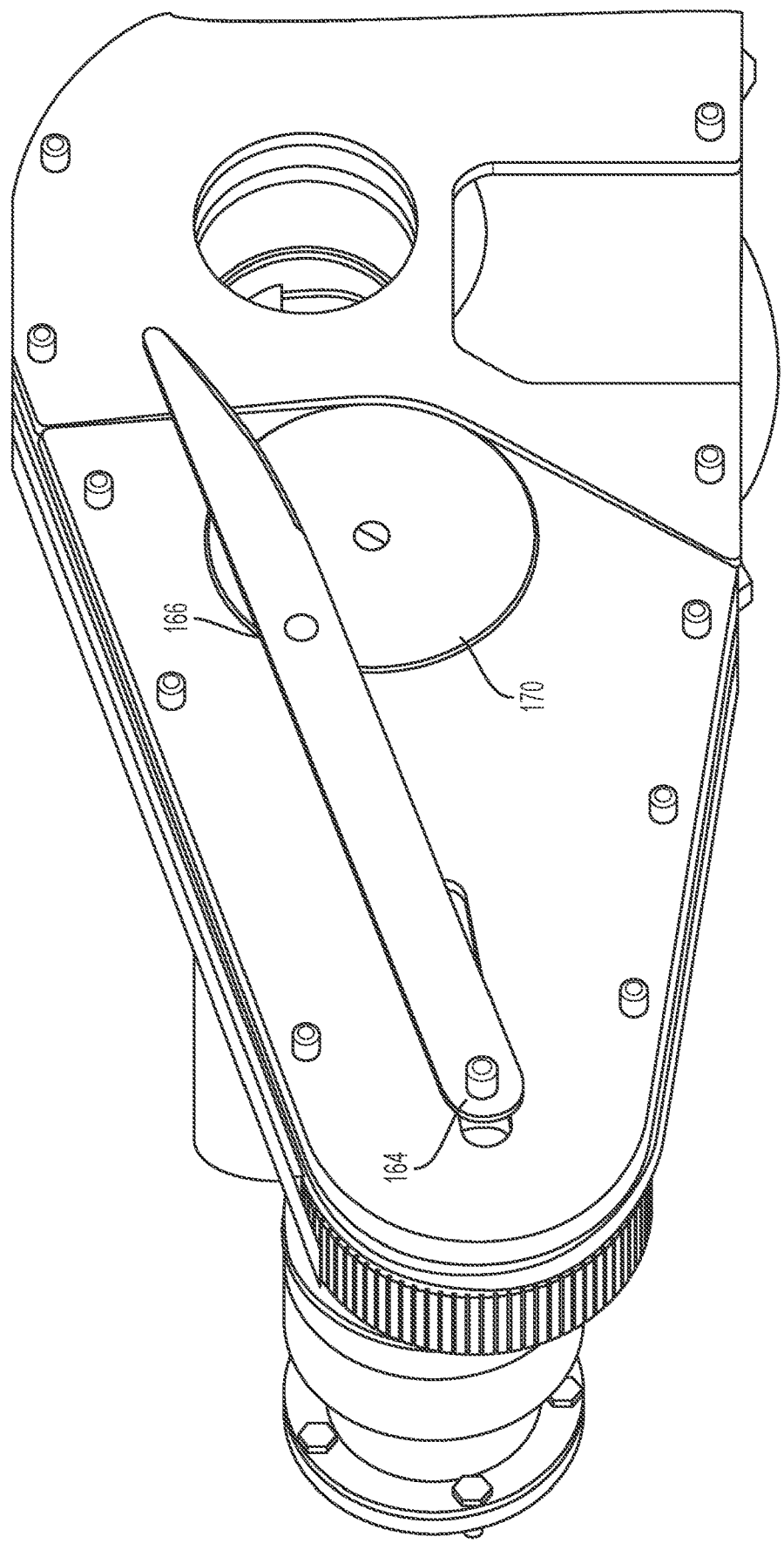
FIG. 12 is a perspective view of a rotary knife prior to a cut according to some embodiments of the systems disclosed herein.
Figure 13:
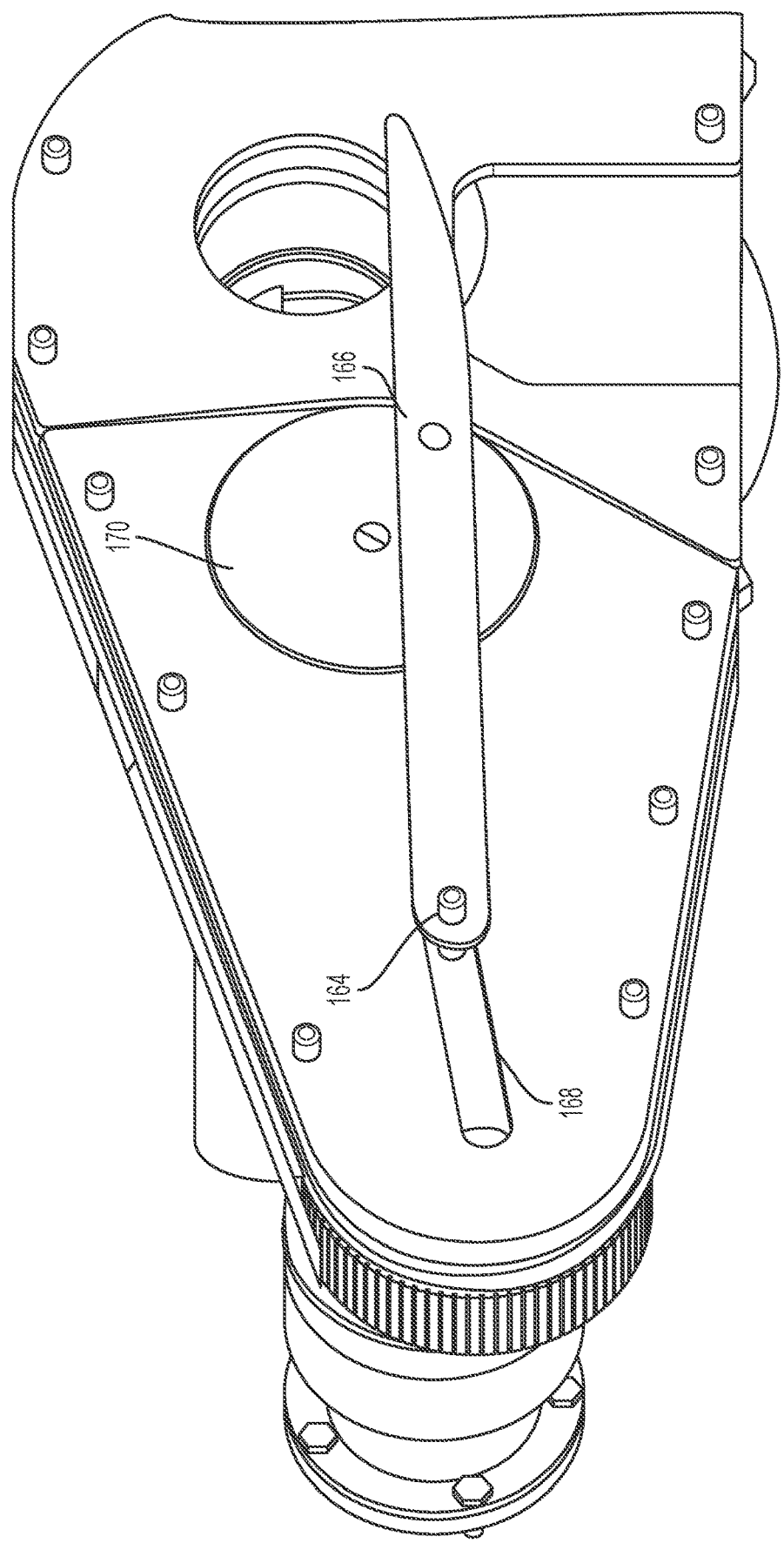
FIG. 13 is a perspective view of the rotary knife of FIG. 12 during a cut according to some embodiments of the systems disclosed herein.
Figure 14:
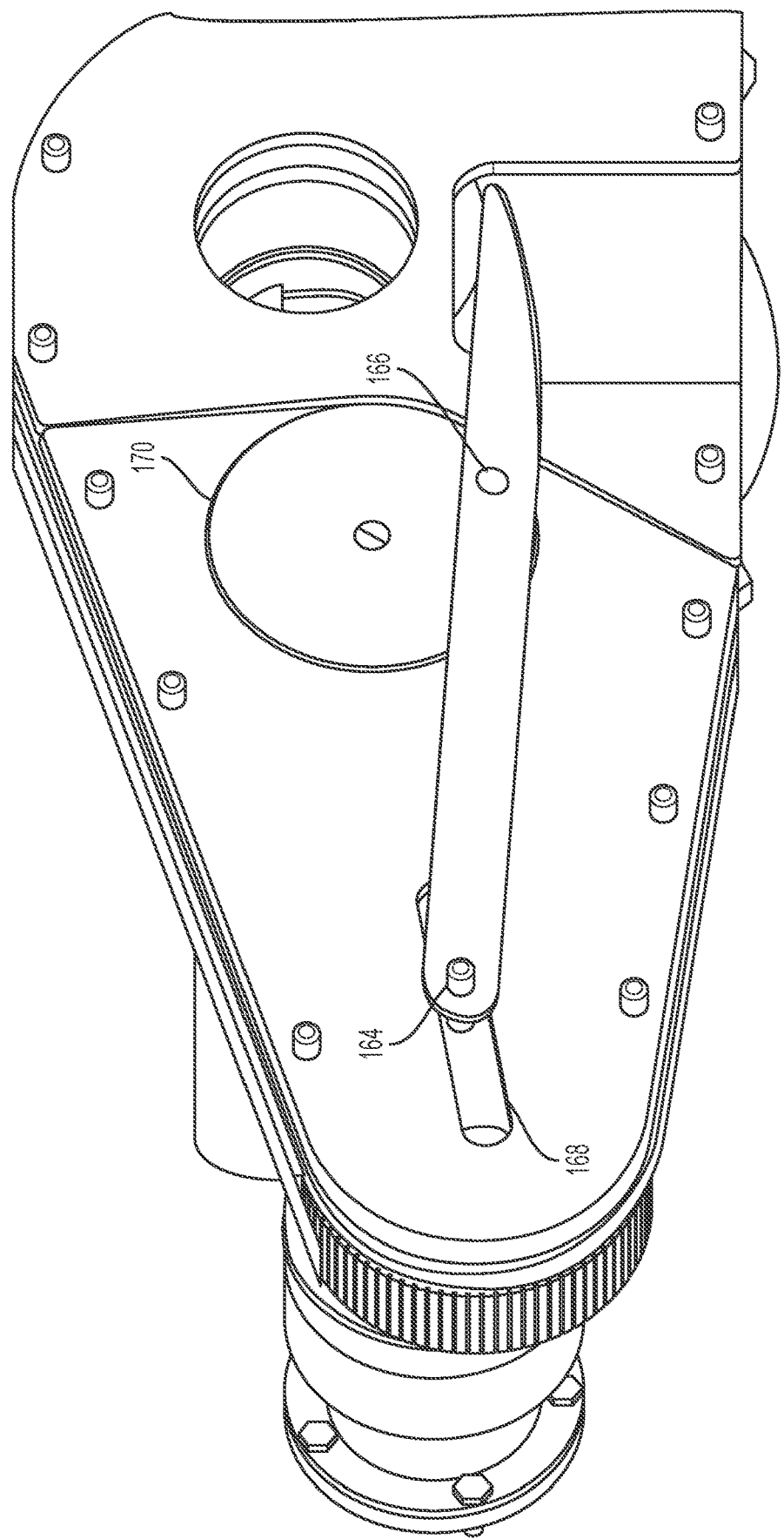
FIG. 14 is a perspective view of the rotary knife of FIG. 12 after a cut according to some embodiments of the systems disclosed herein.

In some embodiments, the knife system can be driven using an auxiliary drive on the portioner 152. The auxiliary drive can be an independently controlled drive mechanism that is separate from the main drive. When the knife system includes a rotary knife, the rotary knife can be configured to simulate a hand cut through horizontal movements. For example, as illustrated in FIGS. 12, 13, and 14, the rotary knife can be configured to perform both a downward chopping motion as well as a horizontal (e.g., forward and/or backward) drawing motion. The combination of these two motions allows the rotary knife to simulate the motion of a human hand cutting with a knife. This movement also allows the cutting edge to pass through the die quickly and provide considerable dwell time for another portion to be produced while the cutting edge is not blocking the front of the portioner. In some embodiments, the knife system can be configured to operate continuously. As illustrated in FIGS. 12-14 the rotary knife can comprise a rotary attachment 166 that causes the knife to perform a continuous motion similar to a hand cut. The knife blade is attached at a first point 164 which allows the butt of the knife blade to slide along a slot 168. The knife blade is also attached to a second point 166 that moves along a rotary pathway 170. As the second point of knife blade 166 moves along the rotary pathway 170, the butt of the knife blade 164 slides back and forth along the slot 168. These two connection points allow the knife to move continuously and perform the downward chopping motion in conjunction with the drawing motion that together simulate a hand cutting motion.

In some embodiments, the angled conveyor system 154 includes a conveyor belt whose angle relative to a horizontal conveyor belt can be adjusted. The angled conveyor system 154 is configured to receive the puck provided by the knife system in the portioner 152. When a puck of a food product is cut from the die, it is desirable for the puck to land on its cut surface (e.g., flat on the belt, not on its edge) because that would allow the mechanical system 100 to provide a handmade appearance to the pressed food product. To this end, the angled conveyor system 154 can be configured to adjust its slope relative to the horizontal conveyor belt so that the puck can land on the angled conveyor system 154 on its cut surface such that the newly cut surface faces up and the previously cut surface faces the conveyor belt. Moreover, it can be desirable for the puck to land such that the top edge contacts the conveyor belt or paper before the bottom edge makes contact. The angled conveyor system 154 can also be configured to adjust its slope relative to the horizontal conveyor belt such that the top edge of the puck makes contact with the conveyor belt or paper before the bottom edge of the puck. In some embodiments, the angled conveyor system 154 can include an adjustable conveyor system on which the angle of the landing area can be adjusted. The angle of the conveyor system 154 can be adjusted based on the speed of the angled conveyor belt 154 and conveyor belts in the paper cutting system 158. In some embodiments, for faster speeds, the conveyor system can be adjusted to have a steeper angle, while for slower speeds, the conveyor system can be adjusted to have a shallower angle. In other embodiments, other factors, such as the height of the portioner 152 above the angled conveyor belt 154, can be taken into account when adjusting the angle. In some cases, the angle of the angled conveyor system 154 can be adjusted within a predetermined range of angles. For example, the angle of the angled conveyor system 154 can be adjusted between 45 degrees and 90 degrees.

Once the adjustable conveyor system 154 receives the puck, the adjustable conveyor system 154 is configured to provide the puck to an in-feed horizontal belt 201 of the paper cutting system 158. As the puck is transported on the in-feed horizontal belt 201, the puck can be pressed using an extended flattener 156. The extended flattener 156 can be configured to gradually press down the puck so that the pressed puck has a desired thickness and diameter. The slope of extended flattener 156 can be adjusted to accommodate different product formulations. For example, a steeper angle that starts from a wide setting and flattens to a narrow setting can be appropriate for some beef products. In contrast, relatively shallow angle that starts from a narrow setting and flattens to a slightly narrower setting can be appropriate for some poultry products. In some embodiments, the slope of extended flattener 156 can be adjusted by adjusting the position of two or more rollers.

In some embodiments, the extended flattener 156 includes a powered press belt. The powered press belt can include a plurality of rollers that supports a press belt of a predetermined length. The plurality of rollers can be configured to rotate the press belt at a predetermined speed. The predetermined speed can match the speed at which the in-feed horizontal belt 201 transports the puck.

In some embodiments, the powered press belt can include at least three rollers, including a first roller, a second roller, and a third roller. The first and second rollers can be positioned at the same, first vertical height, and the third roller can be positioned at a second vertical height. In some embodiments, the second roller can be placed higher than the first roller but lower than the third roller such that a puck of product first makes contact with a first slope between the third roller and the second roller. Once the puck reaches the second roller, the puck then makes contact with a second slope between the second roller and the first roller. This two-slope option can help the finished product maintain its shape and minimize expansion after the puck is formed. The first roller can be displaced horizontally from the second roller by a first distance, and the third roller can be displaced horizontally from the second roller by a second distance.

In some embodiments, the powered press belt can be configured to accommodate a range of second vertical heights and/or second distances to provide an adjustable angle at the inlet of the power press belt. The adjustable angle at the inlet of the power press belt can allow the puck to be pressed gradually as the puck is transported from the third roller to the second roller. In some embodiments, the powered press belt can be configured to accommodate a range of first distances to provide memory to the pressed puck. For example, the first distance between the first roller and the second roller can be increased to provide an extended amount of time over which the puck is pressed. Such an extended amount of time is designed to provide memory to the pressed puck. Once the puck is pressed by the power press belt, the pressed puck on the paper backing continues down the in-feed belt 201.

In some embodiments, the paper cutting system 158 is configured to cut the paper backing underneath the pressed puck to provide the pressed puck on a sheet of paper. In some embodiments, the paper cutting system 158 can be programmed by software or triggered by a sensor to cut in-between pressed pucks, so that no additional equipment is required to add a sheet of paper to the pressed pucks. In some cases, the paper cutting system 158 can be configured to cut the paper backing so that a plurality of pressed pucks is placed on a single sheet of paper (e.g., two patties on a single sheet of paper).

FIGS. 2-3 illustrate an operation of the paper cutting system 158 in accordance with some embodiments. The paper cutting system 158 includes an in-feed belt 201. The in-feed belt 201 is configured to transport the pressed puck 300 on a paper backing 900. The pressed puck 300 and the paper backing 900 pass a knife assembly 110 with a blade 111 that is actuated by a reciprocating gearbox 100 and a cam system to cut the paper to produce the pressed puck 310 on a sheet of paper. The pressed puck on a sheet of paper is conveyed away on an output belt 200. A die 114 between belt 201 and belt 200 allows the knife to pass through the paper under the meat to make a clean cut. In some embodiments, the knife assembly 110 is configured to cut only the paper backing 900 (e.g., not the pressed puck 300) so that each pressed puck can be placed on a separate sheet of paper.

For example, in order to cut the paper backing 900, the knife assembly 110 can be placed at a fully upward position, disposed most proximate to the paper backing feed source side of the system (e.g., to the right). The in-feed belt 201 and the output belt 200 move from right to left in the figure, from a feed side to an output side. As shown in more detail in FIGS. 4 and 5, the blade 111 is configured to move up and down with a cam, while the knife assembly 110 is reciprocated with a rack and pinion gearing system with upper and lower racks.

As shown by the arrow on the blade 111 in FIG. 2, the blade 111 is configured to move downwardly while the knife assembly with the die 114 is moving forward from the paper backing feed source side of the system to the cut side (right-to-left) at approximately the speed of the in-feed conveyor belt 201.

FIG. 2 shows the blade 111 in the fully cut position, extending through die 114 between belts 200 and 201 before the cam 220 (FIG. 5) and a spring set begin to return blade 111 to its fully up position. The cam and forward speed control can be designed such that, at this point, the knife assembly accelerates forward and away from the last cut sheet of paper to help reduce the possibility of the knife blade sticking to the cut sheet of paper.

Subsequently, the knife assembly 111 returns to its upper position, and the knife assembly is at its farthest point to the output side, from where it will move back toward the feed side. With regard to the crank 230 (FIG. 5), the forward and backward motions are each 180 degrees of the crank rotation. In the forward direction, the downward motion of the knife takes place in the first 120 degrees, while the upward motion takes place in the remaining 60 degrees.

In FIG. 3, the knife assembly 111 can move to its uppermost position, while the knife assembly 111 is returning to its rightmost position most proximate to the paper backing feed source. The speed of the return with respect to the feed belt provides portion length and thus weight for the cut sheet of paper.

Figure 4:
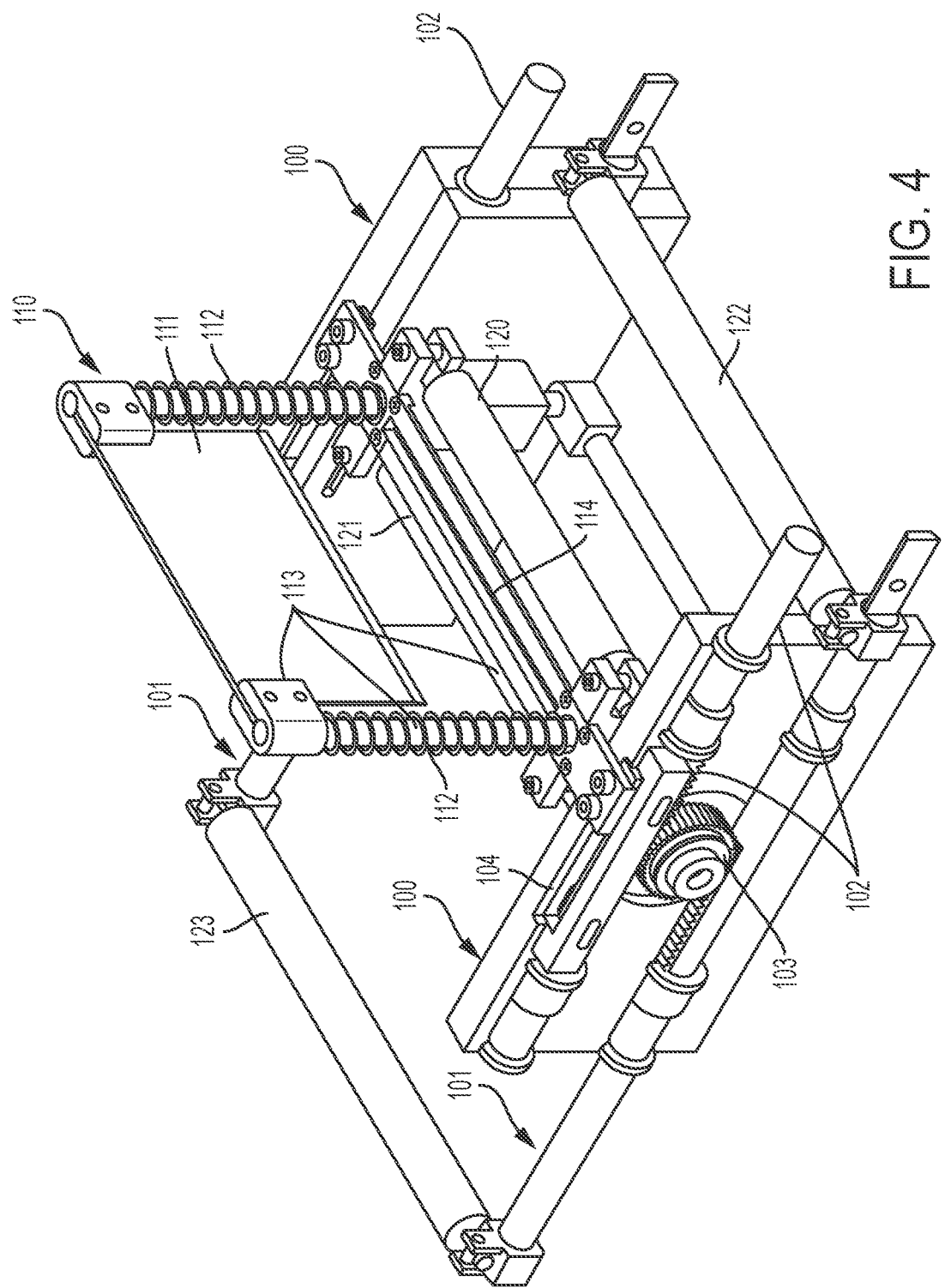
FIG. 4 is a perspective view of the knife and gearbox construction according to some embodiments of the systems disclosed herein.
Figure 5:
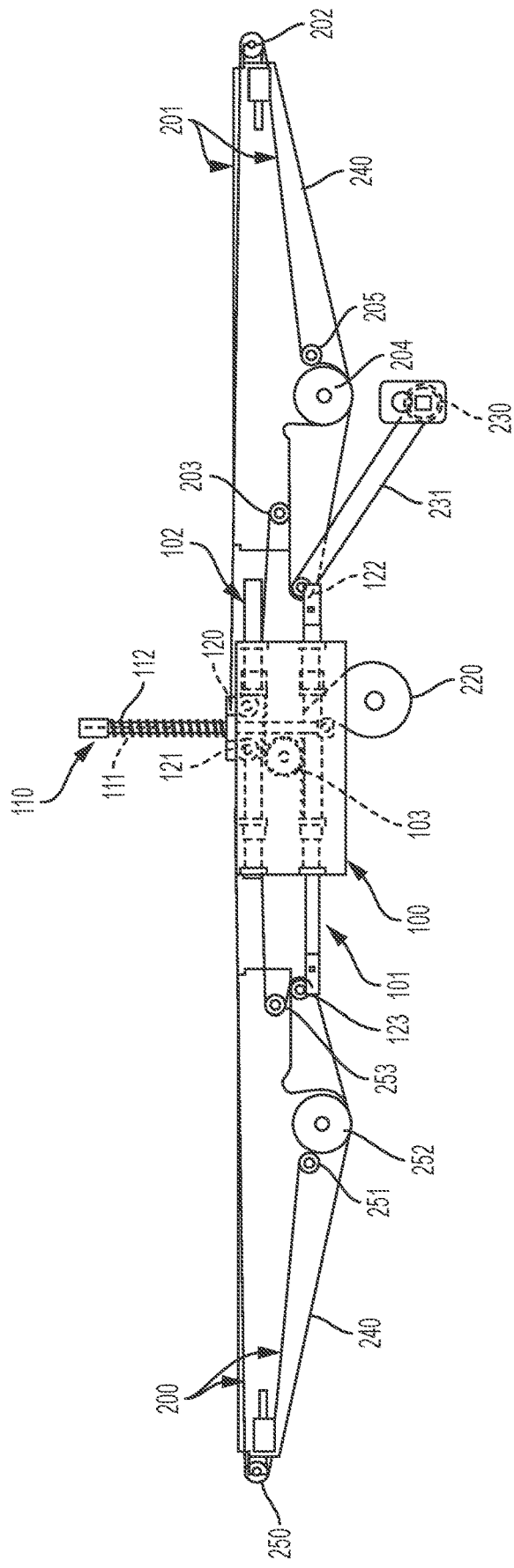
FIG. 5 is a side view showing the knife and gearbox construction, cam, conveyors and rollers according to some embodiments of the systems disclosed herein.

More Detailed View of the Paper Cutting System (FIGS. 4-5)

FIGS. 4 and 5 provide more detailed views of the paper cutting system 158, which includes a gearbox, cam, conveyors, and rollers, in accordance with some embodiments. FIG. 4 shows a perspective view of the knife and gearbox construction in an exemplary embodiment of the systems disclosed herein, where a knife assembly 110, including knife support 113, spring set 112, knife blade 111 (which sometimes may be referred to as the knife), and die 114, is mounted on reciprocating gearboxes 100. FIG. 4 shows a proximal gearbox 100 in an open view, revealing lower rack 101 and upper rack 102 with a pinion 103 between them. FIG. 4 also shows an aperture 104 in gearbox 100 which allows knife assembly 110 to freely move back and forth during the reciprocation cycle. FIG. 4 additionally shows a first upper front roller 120 and a second upper front roller 121 attached to knife assembly 110, and first lower front roller 122 and second lower front roller 123 coupled to lower rack 101. These rollers are mounted to allow them to rotate. The conveyors are omitted from this figure for easier viewing.

Reciprocating Gearboxes

As shown in FIG. 4, embodiments of the systems disclosed herein include a pair of reciprocating gearboxes operated in tandem. Each reciprocating gearbox includes two opposing racks set above and below a pinion (gear). When either the upper or lower rack is actuated to move laterally, the gearbox causes the opposing rack to be moved in the opposite direction. This motion allows the knife assembly to be reciprocated away from and towards the paper backing feed source in, and opposite to, the direction of paper backing flow in response to a simple crank mechanism rotation. In some embodiments, the crank mechanism actuates the lower rack. In other embodiments, the crank mechanism actuates the upper rack. The crank mechanism can include a crank rod. This movement can be obtained using a combination of cams and timing belts. The knife assembly of the disclosed system thus moves substantially parallel with the paper backing flow, as the paper backing is transported through the cutting zone.

The reciprocating gearboxes further include a gearbox motor (not shown), that drives a main crank 230, coupled to a crank rod 231 (FIG. 5), which in turn pushes the lower rack 122 of each reciprocating gearbox to be motored away from and towards the paper backing feed source at a set distance. In response, the upper rack is moved in the opposite direction. This drive also rotates the knife cam 220 (FIG. 5). In some embodiments, a single gearbox motor drives both gearboxes. In further embodiments, each gearbox is driven by a separate gearbox motor. The gearbox motor can also rotate the knife cam so that the rack movement is followed accurately by the knife cam, ensuring correct operation and synchronization.

While the crank 230 turns and the knife assembly moves away from the paper backing feed source, the cam rotates and pulls the knife down and through the die 114, providing the cutting action on the paper backing. As the full forward position is reached by the reciprocating gearbox (i.e. the point furthest away from the paper backing feed source), the cam clears the knife and it returns to the full up position assisted by the spring set. The cam at this point again makes contact with the knife to ensure it is in the fully up position before it starts the return portion of the cycle.

Knife Assembly

The embodiments of the systems disclosed herein also include a knife assembly 110. In some embodiments, the knife assembly is mounted on the upper rack of the gearboxes. As the gearboxes are reciprocated from the drive crank, the assembly moves in a reciprocating manner away from and towards the paper backing feed source and parallel to the feed flow. In some embodiments, the knife is mounted on the support and operated by a cam set situated below the knife assembly. In these embodiments, the knife is actuated down as the knife assembly is moving away from the paper backing feed source at about the same speed as the paper backing flow. This results in portion cutting on the fly without the need to stop or slow the paper backing flow.

Knife and Knife Cams

The systems disclosed herein further include a knife blade mounted to the knife assembly, and held in the up position by a set of springs that provide or help provide a progressive return when the knife is released from the down position. In order for the knife to move down through the paper backing and cut off a portion of the paper backing, a spiral rotating cam can be used. In some embodiments, the spiral rotating cam is located below the knife in a fixed location and is synchronized with the gearbox crank so that its action is timed with the forward and back movement of the reciprocating gearboxes and knife assembly.

The cam profile not only pulls the knife blade down in order to cut the paper backing flow into a predetermined portion, but also insures that the knife is in the full up position before the knife assembly and knife start to move towards the paper backing feed source. In some embodiments, the knife assembly and knife blade accelerate forward relative to the speed of the paper backing flow after the cut is made to make it easier to remove the blade from the paper backing and to prevent paper backing buildup against the blade as it returns to the up position.

The knife cam pulls the blade down as the knife assembly (which in some embodiments is attached to the upper rack) moves away from the paper backing feed source. The cam releases the knife before the rack changes direction and the knife is pushed back to upper position by a set of springs. The cam then comes back into contact with the knife as the knife assembly returns, ensuring it is in the fully up position.

The spring set in the reciprocating gearbox are sufficiently powered to ensure the blade quickly comes up and clears the paper backing as it moves down the line.

FIG. 5 shows a side-view schematic of an exemplary embodiment of the systems disclosed herein, with a better view of the conveyors and rollers. Knife assembly 110 is shown with a set of springs 112 and is mounted to gearboxes 100 that are operated by a crank 230 and a crank rod 231. Upper rack 102 and lower rack 101 are shown on either side of pinion 103 in gearboxes 100, where spiral rotating cam 220 operates the knife support and blade 111.

An in-feed belt 201 on the right is fed around first fixed rear roller 202, first upper front roller 120, first fixed middle roller 203, first lower front roller 122, first return roller 204 and back to first fixed rear roller 202. An in-feed rod 205 picks up slack from in-feed belt 201. Similarly, on the output side shown on the left, an output belt 200 is fed around a second fixed rear roller 250, a second return roller 252, a second lower front roller 123, a second fixed middle roller 253, a second upper front roller 121, and back to second fixed rear roller 250. A lower output feed rod 251 is pictured picking up slack from output belt 200. First and second fixed rear rollers 202 and 250, first and second return rollers 204 and 252, and first and second fixed middle rollers 203 and 253 are affixed to a frame 240. Rollers 120, 122, 121, and 123 are coupled to the rack and pinion.

In-Feed and Output Belts

The in-feed and output belts 201, 200 are co-planar (as shown) and arranged in a back-to-back arrangement so that the paper backing can move from the in-feed belt, past the knife assembly, and to the output belt. The in-feed belt brings the paper backing to the cutting zone and then the output belt takes away the cut sheets of paper away from the cutting zone. In some embodiments, the in-feed and output belts comprise upper front rollers fastened to the upper racks of the gearboxes or the knife assembly, and lower front rollers fastened to the lower racks of the gearboxes, respectively, fixed rear rollers at the ends of the belt system, fixed middle rollers disposed between the ends of the belt system and the gearboxes, and fixed return rollers disposed between the middle and rear rollers.

In some embodiments, the in-feed belt feeds around a first fixed rear roller on the in-feed side of the knife assembly, around a first upper front roller on the in-feed side of the knife assembly, around a first fixed middle roller on the in-feed side of the knife assembly, around a first lower front roller on the in-feed side of the knife assembly, around a first return roller on the in-feed side of the knife assembly, and back to the first fixed rear roller.

In some embodiments, the output belt feeds around a second fixed rear roller on the output side of the knife assembly, around a second upper front roller on the output side of the knife assembly, around a second fixed middle roller on the output side of the knife assembly, around a second lower front roller on the output side of the knife assembly, around a second return roller on the output side of the knife assembly, and back to the second fixed rear roller.

The belts, although independently driven, have upper and lower front rollers attached to the upper and lower racks of the reciprocating gearbox. This configuration allows the knife and knife assembly to move away from the paper backing feed source as the first upper front roller moves the in-feed belt with it. The belt length is kept constant by the simultaneous motion of the lower rack and first lower front roller moving in the opposite direction. Similarly, the output belt is moved away from the paper backing feed source as the second upper front roller moves the output belt with it, and the output belt length is kept constant by the simultaneous motion of the lower rack and second lower front roller moving in the opposite direction.

The upper and lower racks of the reciprocating gearboxes move to enable the top of the in-feed and output belts to move with the knife assembly. During the cut cycle, the in-feed belt requires slack as the first upper front roller moves away from the paper backing feed source (right to left as shown in FIG. 5) with the knife assembly, and the first lower front roller moves towards the paper backing feed source (left to right) with the lower rack. This slack is provided by a lower in-feed rod moving towards the paper backing feed source and away from the first return roller, thus freeing a portion of the belt. Simultaneously, the output belt has slack taken up as the second upper front roller moves away from the paper backing feed source with the knife assembly and the second lower front roller moves towards the paper backing feed source with the lower rack. This slack is taken up by a lower output feed rod moving towards the paper backing feed source and towards the second return roller, thus taking up the slack. During the portion of the reciprocation cycle following the cut cycle, these processes are performed in reverse, where slack is taken up in-feed belt and provided to the output belt. This process enables the belts to be at a fixed position at the paper backing feed source and output ends of the system, while the section of the belts at the knife assembly lengthen and shorten as necessary to keep the paper backing flowing through the cutting zone at a constant speed.

In some embodiments, the belts are driven by a separate drive motor with a variable speed, however the front upper and lower rollers are mounted to the upper and lower racks of the reciprocating gear boxes, respectively. This connection enables the belts to stay in position relative to the knife assembly as it moves away from and towards the paper backing feed source with the belt length being maintained by the lower roller moving in the opposite direction.

In operation, the paper backing can be placed on the in-feed belt at a constant and continuous flow and belts loading and activation of the knife cycle will cut a portion off the flow as it passes through the cutting zone. The time between cuts can be varied to allow a programmable length of the paper backing to be produced.

In some embodiments, the relevant portions of system are manufactured from stainless steel to enable processing of food products and enable easy cleaning.

In some embodiments, the systems disclosed herein are used for food products. In some embodiments, the systems disclosed herein are used for processing, cutting, and portioning meat. In some embodiments, the meat is ground meat. In further embodiments, the systems disclosed herein are used for non-food products that can be cut with a blade or knife, and where a consistent length or weight is required. In some embodiments, the systems disclosed herein are used for paper.

In some embodiments, the systems disclosed herein provide a cut sheet of paper of a single consistent size. In further embodiments, the systems disclosed herein provide cut sheets of paper of multiple sizes consistently. In some embodiments, the paper backing is cut into a sheet of paper having specified widths and lengths.

Additional Embodiment (FIGS. 6-11)

FIGS. 6-11 include a perspective view and side views of an embodiment with a rocker arm and spring below the gearbox. This embodiment can help reduce wear on bushings for the motion of the knife. The rack and pinion gearing, conveyors, and rollers for the conveyors are substantially the same as for the embodiment of FIGS. 2 and 3, and the resulting output is substantially the same.

Figure 6:
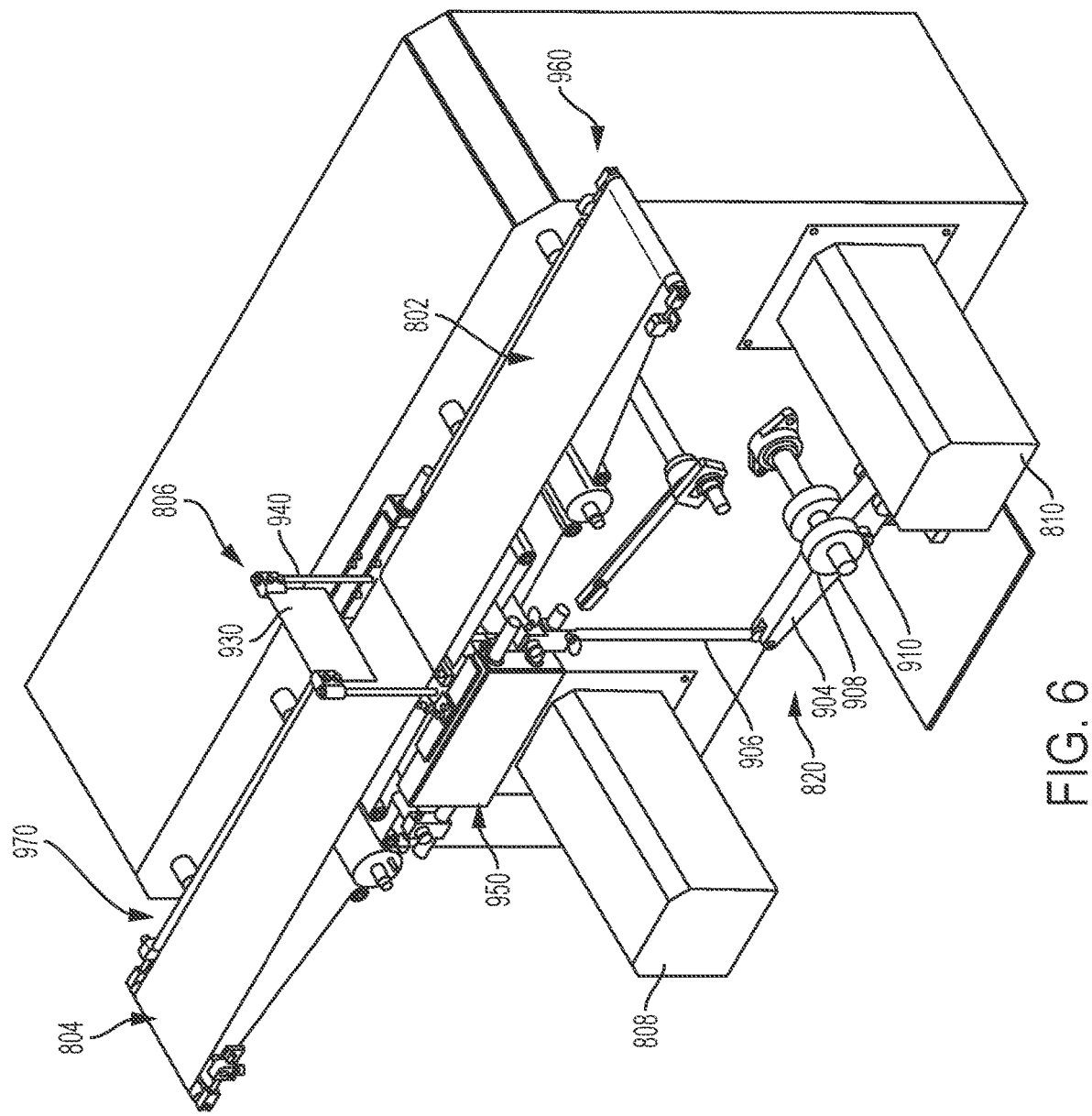
FIG. 6 is a perspective view of the conveyor system and motors with housings according to some embodiments of the systems disclosed herein.

Referring to FIG. 6, an input conveyor 802 provides a paper backing with the cut product and conveys the paper backing to an output conveyor 804 past a knife assembly 806. Operations can be driven with motors with housings 808 and 810. As described above, a rack and pinion assembly 812 can be used to cause the knife assembly 806 to move in a reciprocating manner; and each of conveyors 802 and 804 is mounted to a set of rollers that provide and take up slack as needed as the knife assembly reciprocates. Unlike the embodiment of FIG. 2 where the cam is located near the rack and pinion, and springs are next to the blade, this embodiment includes a rocker arm assembly 820 with cam and spring below the conveyor.

Figure 7:
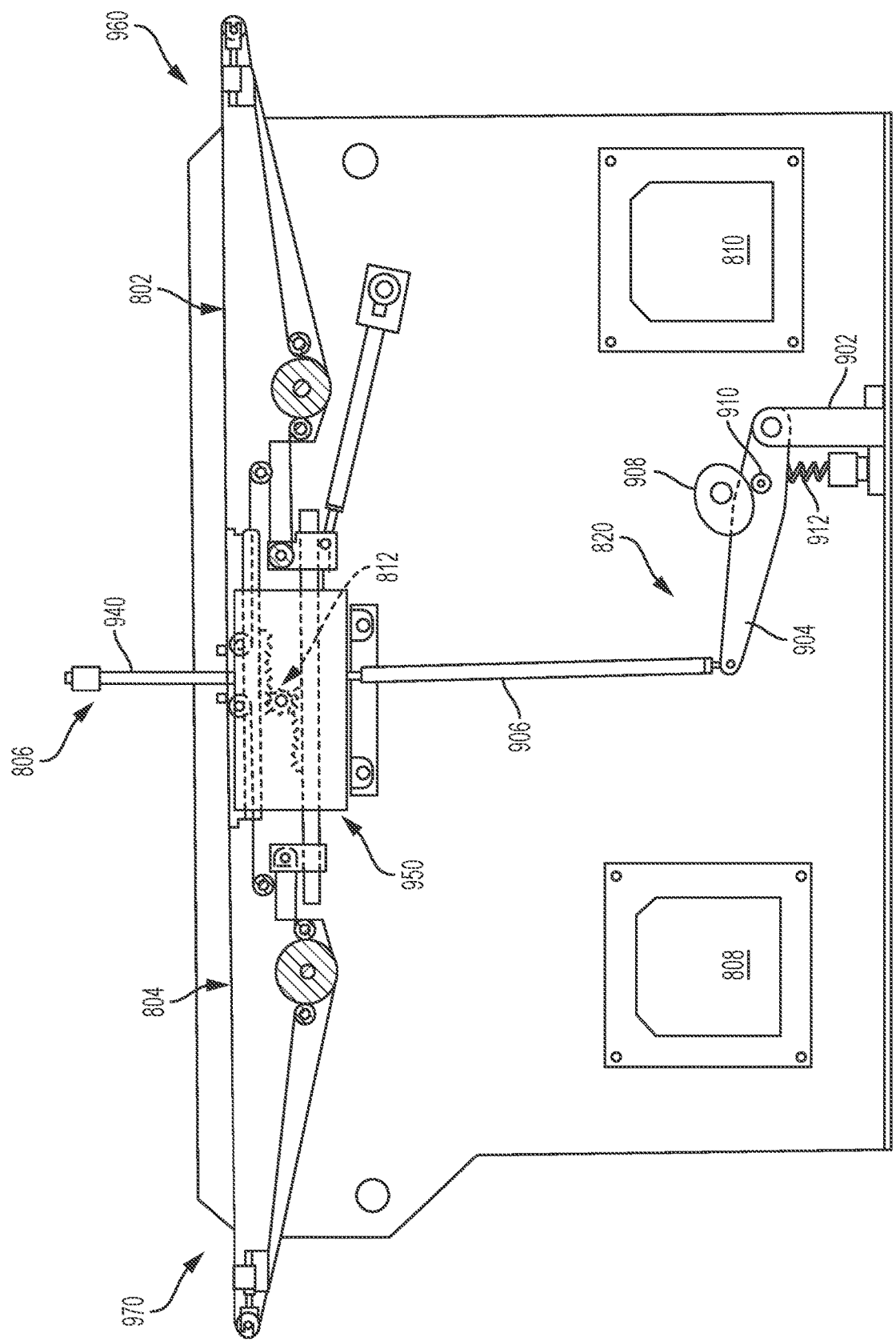
FIG. 7 is a side view of the conveyor system as well as the rocker assembly and support structures according to some embodiments of the systems disclosed herein.

Referring also to FIG. 7, rocker assembly 820 includes a fixed stationary support 902, a support arm 904 pivotally connected to support 902, a rod 906 pivotally connected to support arm 904 and also coupled to knife assembly 806, a cam 908, a follower 910 coupled to arm 904 and engaging cam 908, and a spring 912 coupled to a stationary floor and to support arm 904.

Figure 8:
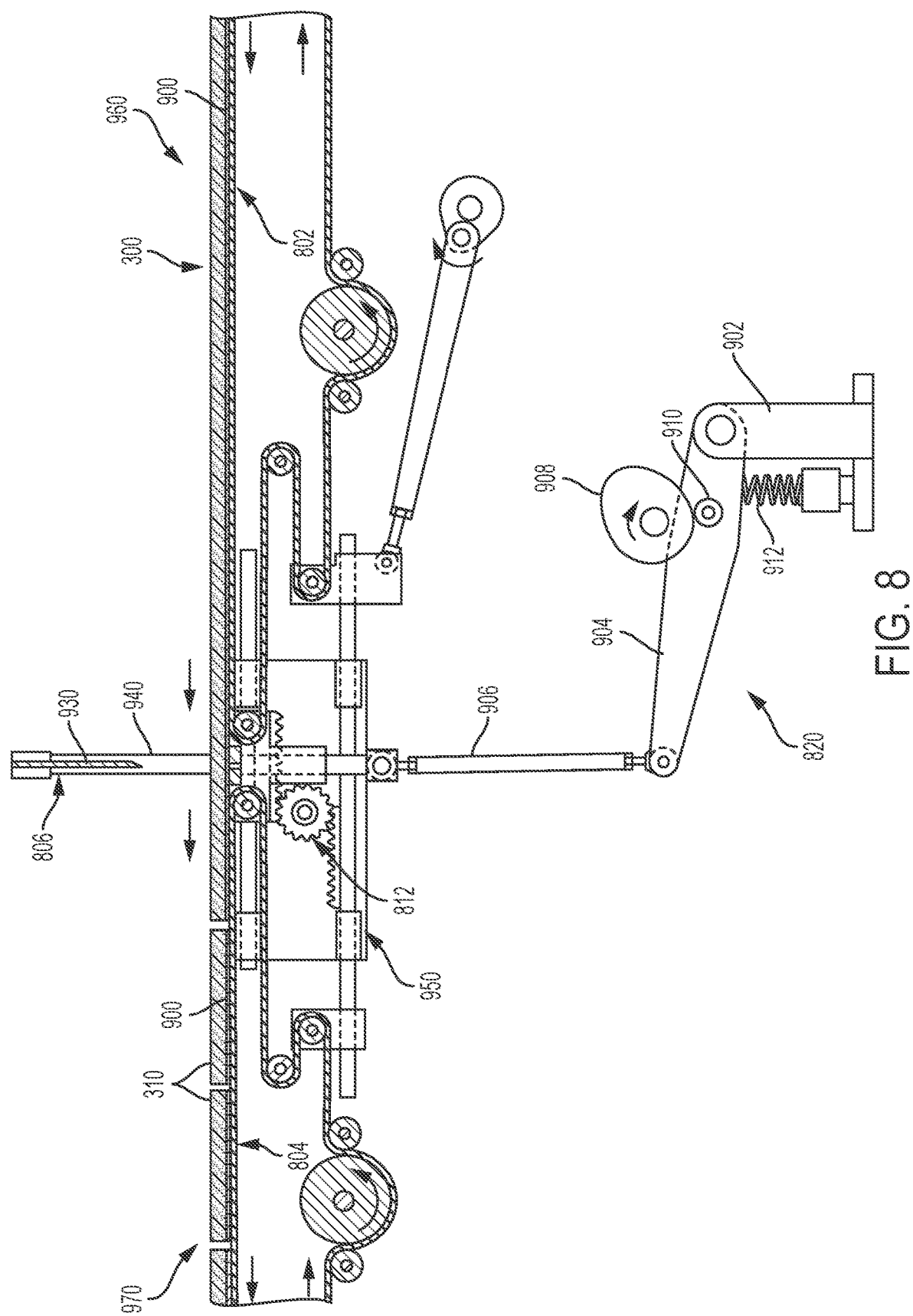
FIG. 8 is a side view of the system with the knife assembly in its uppermost position according to some embodiments of the systems disclosed herein.

FIGS. 8-11 illustrate operation with housing parts removed from view for convenience. Arrows indicate the movements of the rollers, but because they are similar to those shown and described above, a description is not repeated here in detail. In FIG. 8, blade 930 and its support 940 are in an upper position and getting ready to cut. The knife assembly is at the right-most (feed) end and is about to move forward (left).

Figure 9:
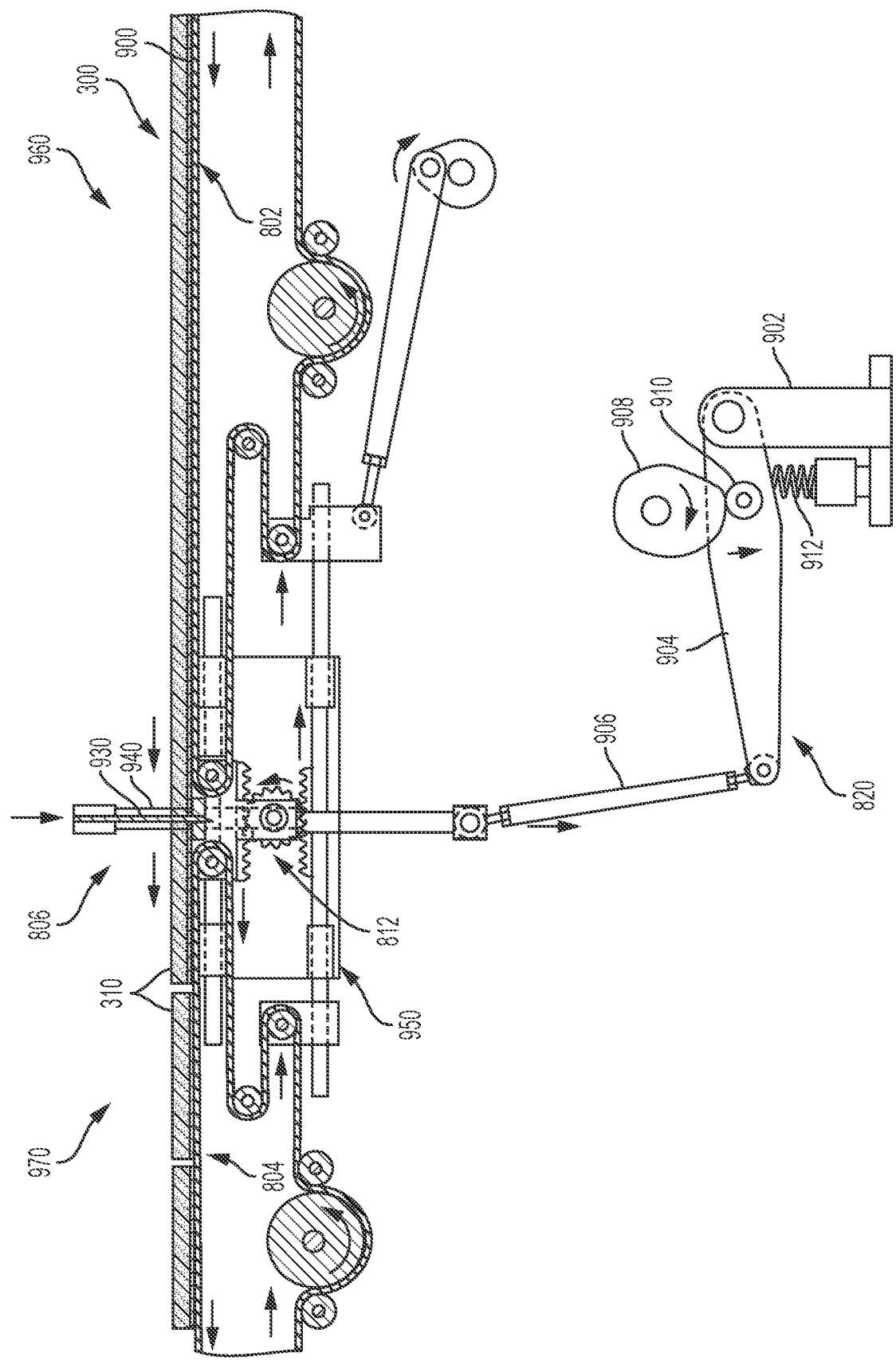
FIG. 9 is a side view of the system with the knife assembly in its fully cut position according to some embodiments of the systems disclosed herein.

Referring to FIG. 9, as non-circular cam 908 rotates and meshes with follower 910, it causes arm 904, rod 906, and blade 930 and support 940 to all move downwardly so that the blade extends through the die to make a clean cut. As they do, the knife support is moving forward (left) within gearbox 950. Rollers on the input conveyor side 960 are providing slack to allow a distal end (left side) of input conveyor 802 to move to the left, while rollers on output conveyor side 970 are taking up slack as the proximal end (right side) of output conveyor 804 moves to the output side (left).

Figure 10:
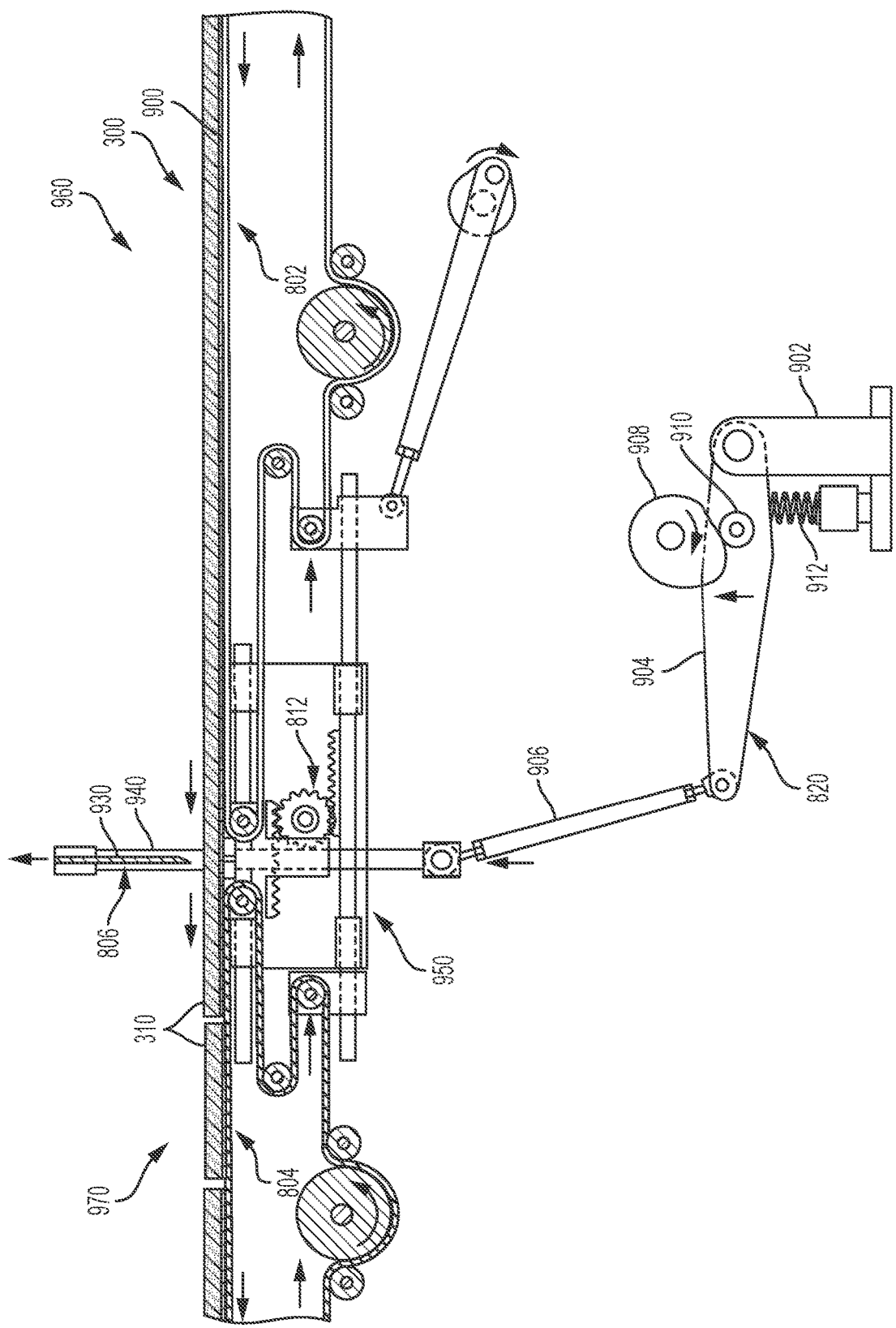
FIG. 10 is a side view of the system after a cut has been made according to some embodiments of the systems disclosed herein.

Referring to FIG. 10, after the cut has been made, the cam causes arm 904, rocker 906, and knife assembly with blade 930 and support 940 to move upwardly, and may allow an accelerated movement leftward to help prevent the blade from sticking to the product. Conveyors 802 and 804 continue to move toward the output end, with rollers coupled to the top and bottom racks and other rollers allowing movement and providing and taking up slack. In FIG. 10, the knife assembly is shown at its leftmost position, where it is about to reverse direction.

Figure 11:
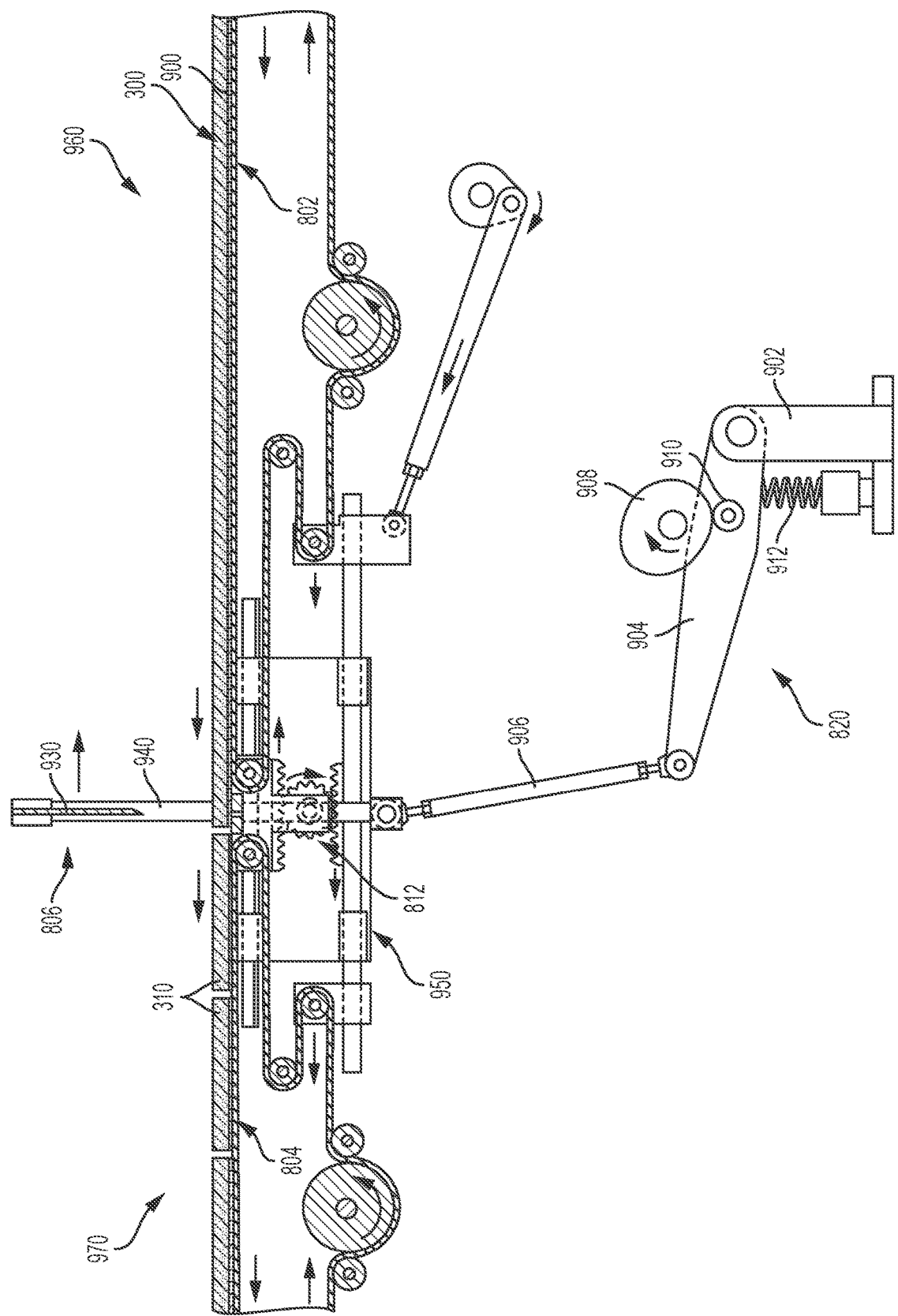
FIG. 11 is a side view of the system as the knife assembly moves upward after a cut has been made according to some embodiments of the systems disclosed herein.

Referring to FIG. 11, as the cam 908 continues to turn and mesh with follower 910, arm 904, and rod 908, the knife assembly continues to move upwardly and move to the input side. Here it is shown at about a lateral midpoint in the gearbox. Now, the rollers on input conveyor side 960 are taking up slack while rollers on the output conveyor side are allowing output conveyor to move to the right. Soon, the blade will be back in the position of FIG. 8 and be ready to cut again.

Conclusion

In some embodiments, the systems disclosed herein provide a cut sheet of paper of a single consistent size. In further embodiments, the systems disclosed herein provide cut sheets of paper of multiple sizes consistently. In some embodiments, the product is cut in specified widths and lengths.

The systems disclosed herein provide a knife that is reciprocated during a cut cycle at about the same speed as a product flow. The cut cycle allows the product feed to keep moving. For ground meat, this system can allow production rates of 150 pieces or more per minute per conveyor line and can improve the accuracy of portioning. Although the feed belts and knife assembly are servo driven for accurate control, the knife is actuated by a profiled cam set that pulls the knife down, and then returned by progressive springs and the same cam, to ensure the knife is fully up on the reset cycle.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims. Other embodiments are within the claims, such as cutting different products, or using different materials.

The invention claimed is:

1. An apparatus comprising:
 an adjustable conveyor configured to carry a paper backing and receive, on the paper backing, a puck of product from a portioner positioned above the adjustable conveyor, wherein a slope of the adjustable conveyor relative to the portioner can be adjusted to allow the puck of product to be properly received from the portioner onto the paper backing;
 a first conveyor belt including a proximal end substantially adjacent to the adjustable conveyor, the first conveyor belt being configured to receive the paper backing and the puck of product from the adjustable conveyor;
 a second conveyor belt that is substantially co-planar with the first conveyor belt and including a proximal end that is near a distal end of the first conveyor belt; and
 a knife assembly mounted at least in part between the first and second conveyor belts, wherein the knife assembly comprises a die slot between the first and second conveyor belts, and a blade that is movable in a first direction perpendicular to the first plane from an upper position spaced in the first direction from the first and second conveyor belts to a lower position, wherein the knife assembly is configured to cut only the paper backing into a sheet of paper while the paper backing is transferred from the first conveyor belt to the second conveyor belt, thereby providing the puck of product on the sheet of paper.

2. The apparatus of claim 1, wherein the slope of the adjustable conveyor can be adjusted to accommodate changes to a speed of the portioner and/or a shape of the puck of product provided from the portioner.

3. The apparatus of claim 1, wherein the slope is within a range of 45 degrees and 90 degrees.

4. The apparatus of claim 1, wherein the portioner comprises a knife system configured to drop the puck onto the paper backing carried by the adjustable conveyor.

5. The apparatus of claim 4, wherein the knife system comprises a rotary knife.

6. The apparatus of claim 5, wherein the rotary knife comprises:
a wall defining a slot;
a rotary plate; and
a knife including a first end, an intermediate portion, and a second end, the second end including a cutting blade, and the intermediate portion disposed between the first end and the second end;
wherein the first end cooperates with the slot, and the intermediate portion is coupled to the rotary plate; and
wherein the rotary plate is configured to move the intermediate portion along a circular pathway and is configured to reciprocatingly move the first end along the slot when the rotary plate is rotated.

7. The apparatus of claim 1, further comprising a flattener including a powered press belt, wherein the powered press belt comprises a first roller, a second roller, and a third roller, wherein the first roller is positioned at a first vertical height, the second roller is positioned at a second vertical height, and the third roller is positioned at a third vertical height.

8. The apparatus of claim 7, wherein the first roller is displaced horizontally from the second roller by a first distance, and the third roller is displaced horizontally from the second roller by a second distance.

9. The apparatus of claim 1, wherein the knife assembly is triggered to cut in-between a first puck and a second puck to provide the first puck and the second puck on a first sheet of paper and a second sheet of paper, respectively.

10. The apparatus of claim 9, wherein the knife assembly is triggered not to cut in-between the second puck and a third puck to provide the second puck and the third puck on the second sheet of paper.

11. The apparatus of claim 1, further comprising a paper roller that is configured to provide the paper backing to the adjustable conveyor.

12. The apparatus of claim 11, wherein the adjustable conveyor is configured to pull the paper backing from the paper roller.

13. The apparatus of claim 1, wherein the first and second conveyor belts are mounted about respective first and second sets of rollers for alternately providing and taking up slack as the knife assembly, the distal end of the first conveyor belt, and the proximal end of the second conveyor belt move together laterally in a reciprocating manner.

* * * * *